March 29, 1949.　　　H. V. PACKER　　　2,465,471
ATTACHMENT FOR SHAFTS
Filed Oct. 14, 1944
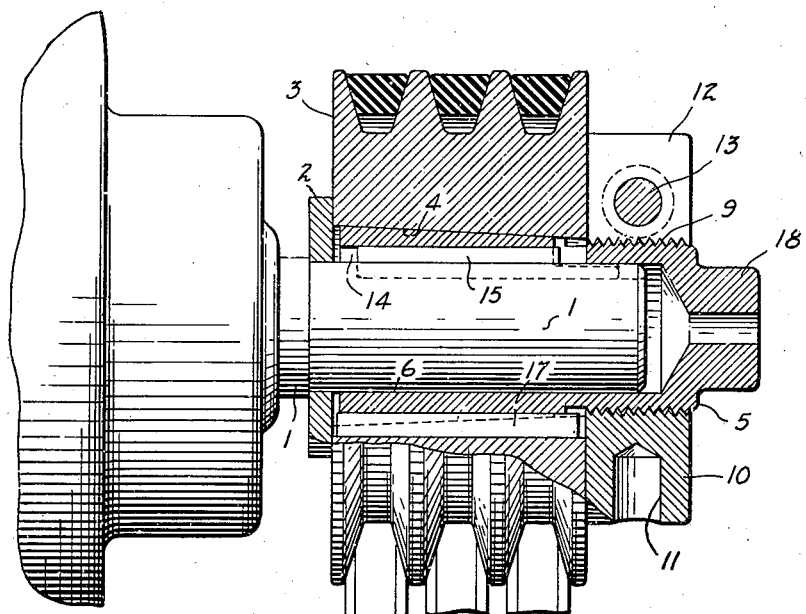
Fig. 1
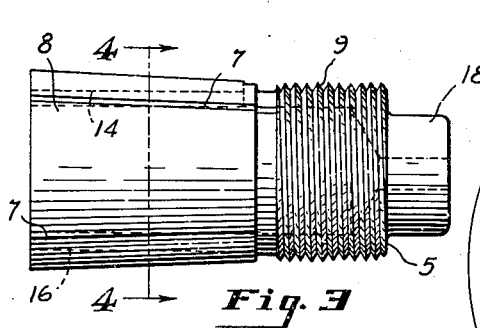
Fig. 3
Fig. 4
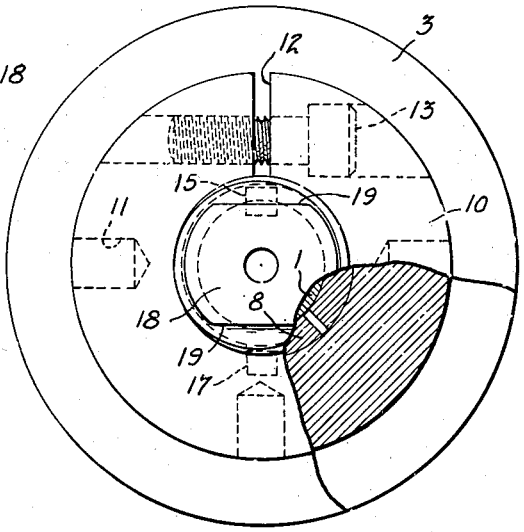
Fig. 2
INVENTOR.
Harry V. Packer
BY
Evans & McCoy
ATTORNEYS Patented Mar. 29, 1949

2,465,471

UNITED STATES PATENT OFFICE 2,465,471

ATTACHMENT FOR SHAFTS

Harry V. Packer, East Cleveland, Ohio, assignor to The Oster Manufacturing Company, Cleveland, Ohio, a corporation of Ohio Application October 14, 1944, Serial No. 558,759

4 Claims. (Cl. 287—53)

This invention relates to clamping attachments for shafts and particularly to an attachment for affixing a machine element to an end of a power driven shaft.

The invention has for an object to provide an attaching means that is easily applied to the shaft and that is quickly detachable therefrom.

A further object of the invention is to provide an attachment that is effective to hold the attached element against both axial and angular movements with respect to the shaft.

A further object of the invention is to provide a clamping collet that is adapted to be mounted on the end of a shaft and to have wedging engagement between the shaft and the attached element, the collet being provided with an impact head that facilitates the freeing of the wedged elements after the collet clamping nut is released.

With the above and other objects in view, the invention may be said to comprise the device as illustrated in the accompanying drawings, hereinafter described and particularly set forth in appended claims, together with such variations and modifications thereof as will be apparent to one skilled in the art to which the invention pertains.

Reference should be had to the accompanying drawings forming a part of this specification, in which:

Fig. 1 is an axial section through a clamping attachment embodying the invention;

Fig. 2 is an end elevation of the attachment with a portion broken away and shown in section;

Fig. 3 is a side elevation of the clamping collet, and

Fig. 4 is a section through the collet taken on the line indicated at 4—4 in Fig. 3.

The device of the present invention is a device for releasably securing a machine element to a shaft. The device is of quite general application but for purposes of illustration, the attachment of the present invention is herein shown connecting a belt pulley to a power shaft. The shaft which is indicated by the reference number 1 has a stop shoulder adjacent the end thereof which is formed by a suitable ring or collar 2 mounted on the shaft. A pulley 3 is mounted on the shaft with its inner face engaging the stop shoulder 2, the pulley 3 having an outwardly tapering opening 4 which receives a collet 5 that is employed to clamp the pulley to the shaft. The collet 5 has a shaft receiving bore 6 opening to its inner end, the inner end of the collet being of tubular form and providing a shaft receiving socket. The tubular inner portion of the collet is externally enlarged at its inner end and provided with equiangularly spaced longitudinal cuts 7 that provide resilient arcuate clamping jaws 8 that are adapted to be pressed radially into gripping engagement with the shaft 1. Outwardly of the cuts 7, the collet 5 is provided with an exteriorly threaded portion 9 that is adapted to receive a nut 10. The inner enlarged clamping end of the collet is of a size to fit within the interior of the opening 4 near the inner end thereof and is preferably tapered to fit the tapering opening 4. The threaded portion 9 of the collet is of less diameter than the small end of the opening 4 so that the pulley 3 may be passed over the threaded portion 9 onto the tubular clamping portion of the collet. The nut 10 is provided with spanner sockets 11 and is adapted to be screwed against the front face of the pulley 3 to move the pulley axially with respect to the collet, to clamp the pulley to the collet and to wedge the jaws 8 between the pulley 3 and the shaft 1, the opening 4 of the pulley having a small angle of taper so as to have effective wedging action on the jaws 8 to firmly clamp the collet to the shaft.

In order to prevent loosening of the pulley 3 during operation, means is provided for locking the nut 10 to the collect 5. As herein shown, the nut 10 is radially slit at 12 so that it can be contracted upon the threaded portion 9 of the collet and a screw 13 extending across the slit 12 is adapted to draw the separated ends of the nut together and clamp the nut on the collet 5.

In order to accurately position the pulley and clamping collet and to positively lock the pulley and clamping collet against angular movements with respect to the shaft, the collet may be keyed to the shaft and to the pulley. As shown in Figs. 1 and 4, the tubular portion of the collet has an internal keyway 14 that is adapted to receive a key 15 that engages in a suitable slot in the shaft 1. The collet is also provided with a longitudinal external keyway 16 that is adapted to receive a key 17 that fits in an internal slot in the pulley 3.

Outwardly of the threaded portion 10 the collet 5 is provided with an axially thick head 18 that overlies the outer end of the shaft 1 and that is provided with flat wrench receiving faces 19. The head 18 is adapted to be engaged by a wrench to hold the collet against turning movement while the nut 10 is being tightened on the collet to clamp the pulley 3 to the collet and to the shaft 1. Due to the small angle of taper of the opening 4 and the relatively large area of contact of the tapered collet in the opening 4, the jaws 8 of the collet may be held under such a heavy radial pressure when the nut 10 is tightened on the collet that the shaft collet and pulley will remain in tight wedging engagement after the nut 10 is loosened. The head 18 provides a means for facilitating the freeing of the wedged collet jaws from between the pulley 3 and the shaft 1 after the nut 10 has been loosened. As shown in Fig. 1, the inner end of the collet 5 is spaced outwardly a short distance from the stop shoulder 2 when the pulley is clamped on the shaft, so that the collet may be driven inwardly toward the shoulder 2 by striking the head 18 a sharp tap with a hammer to free the clamping jaws 8 from the shaft and pulley, after which the collet and pulley can be readily removed from the end of the shaft. The head 18 being radially thick and axially alined with the body of the collet can transmit heavy axial impacts to the body of the collet without distorting either the threaded nut receiving portion of the collet or the clamping portion thereof.

The clamping of a machine element to a shaft may be quickly effected by assembling the element and collet on the shaft and tightening the nut 10 and screw 13, and the element may be quickly and easily removed by loosening the nut 10 and tapping the head 18 of the collet with a hammer to free the collet from the shaft and from the element carried by the collet.

It is to be understood that variations and modifications of the specific device herein shown and described for purposes of illustration, may be made without departing from the spirit of the invention.

What I claim is:

1. A shaft attachment comprising a clamping collet having an externally threaded outer end portion and an inner tubular shaft clamping socket portion that flares inwardly to an inner end portion of greater external diameter than the threaded portion, said socket portion having circumferentially spaced longitudinal cuts extending from its inner end and providing resilient radially movable shaft clamping jaws, a member having a collet receiving opening extending from its inner face to its outer face and tapering at a small angle toward said outer face, said opening receiving and having wedging engagement with the shaft clamping socket portion of the collet, and a nut on said threaded portion of the collet for engagement with the outer face of said member to clamp the member to the collet and to wedge the clamping jaws between said member and the shaft, said collet having an integral axially thick head portion outwardly of the threaded portion of less diameter than the threaded portion and overlying the end of the shaft on which the collet fits, said head being formed to receive a wrench for holding the collet against turning movements while said nut is being tightened and adapted to withstand axial impacts for freeing the wedged jaws of the collet from the shaft and member after the nut is loosened.

2. An attachment for a shaft having a stop shoulder adjacent an end thereof comprising a collet having an externally threaded outer end portion and an inner contractible tubular shaft clamping socket portion, said socket portion being flared toward its inner end and provided with shaft clamping jaws, a member having a collet receiving opening extending from its inner face to its outer face and tapering at a small angle toward the outer face for wedging engagement with the clamping portion of the collet, the opening of said member being of a size to permit said member to be placed on said collet with its rear face engaging the stop shoulder on the shaft and with the inner end of the collet spaced outwardly of said inner face, a nut on the threaded portion of the collet for clamping said member to the collet and the collet to the shaft, and means for locking said nut to said collet, said collet having a radially thick head overlying the end of the shaft outwardly of the threaded portion and of a diameter less than that of the threaded portion, said head being formed to receive a wrench for holding the collet while the clamping nut is tightened and being adapted to withstand axial impacts for driving said collet toward said shoulder to free the clamping portion of the collet from wedging engagement with said member and the shaft.

3. An attachment for a shaft comprising a collet keyed to the shaft and having a contractible tubular shaft clamping socket portion at its inner end divided by longitudinal slits into resilient clamping jaws, said clamping portion of the collet flaring toward its inner end, the outer end portion of the collet being externally threaded and having an integral axially thick wrench engaging head of less diameter than the threaded portion overlying the outer end of the socket portion, a member having a tapering opening to receive the collet, said member being keyed to the collet and having its tapering opening in wedging engagement with the clamping portion of the collet, and a nut on the threaded portion of the collet inwardly of said head for clamping the member to the collet and the collet to the shaft.

4. An attachment for a shaft having a stop shoulder comprising a clamping collet having an externally threaded outer end portion and a tubular shaft receiving socket portion inwardly of said threaded end portion, the inner end of said tubular portion being of greater external diameter than said threaded portion, said socket portion having circumferentially spaced longitudinal slots providing resilient radially movable clamping jaws, a member having a collet receiving opening that tapers outwardly and of a diameter at its inner end to receive the inner end of the collet and to permit the collet to be positioned with its inner end spaced from the inner face of said member, said member being adapted to be positioned on said shaft with its inner face engaging said stop shoulder whereby said collet may be freed from said member by impacts against its outer end, and a nut on the threaded portion of the collet engageable with the outer face of said member to wedge said collet between said member and the shaft.

HARRY V. PACKER.

REFERENCES CITED

The following references are of record in the file of this patent:

UNITED STATES PATENTS

| Number | Name | Date |
|---|---|---|
| 301,905 | Lytle | July 15, 1884 |
| 840,399 | Taylor | Jan. 1, 1907 |
| 929,851 | Hess | Aug. 3, 1909 |
| 966,666 | Dimler | Aug. 9, 1910 |
| 972,787 | Huyck | Oct. 11, 1910 |
| 1,003,493 | Newmann | Sept. 19, 1911 |
| 1,031,410 | Alexander | July 2, 1912 |
| 1,046,937 | Ash | Dec. 10, 1912 |
| 1,195,482 | Lewis | Aug. 22, 1916 |
| 1,213,888 | Lane | Jan. 30, 1917 |
| 1,400,421 | Colomb | Dec. 13, 1921 |
| 1,403,309 | Follows | Jan. 10, 1922 |
| 1,672,601 | Brent | June 5, 1928 |
| 1,797,296 | Ray | Mar. 24, 1931 |
| 1,812,226 | Walker | June 30, 1931 |
| 1,932,522 | Irgens | Oct. 21, 1933 |
| 2,151,831 | Buccione | Mar. 28, 1939 |
| 2,170,352 | Schaefer | Aug. 22, 1939 |